July 12, 1932. L. O. RUNKLE 1,867,281
SIFTER TRAWL
Filed Aug. 14, 1931
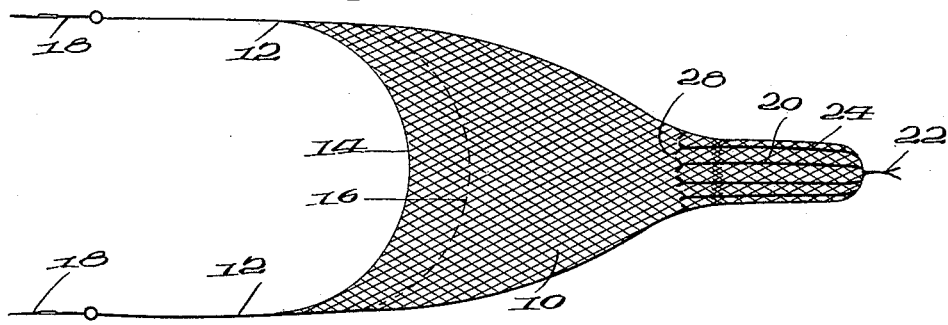
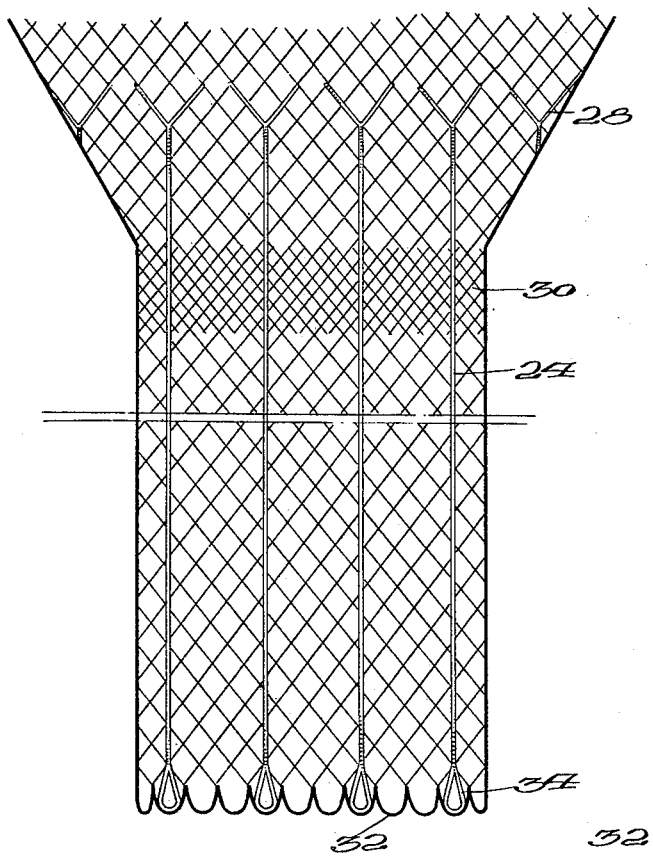
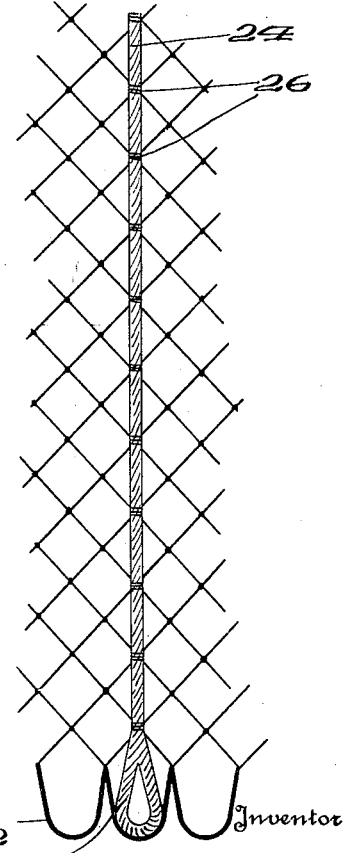

Patented July 12, 1932

1,867,281

UNITED STATES PATENT OFFICE

LLOYD O. RUNKLE, OF GLOUCESTER, MASSACHUSETTS, ASSIGNOR TO THE LINEN THREAD COMPANY, OF NEW YORK, N. Y., A CORPORATION OF NEW JERSEY

SIFTER TRAWL

Application filed August 14, 1931. Serial No. 557,170.

This invention relates to trawl fishing nets, and more particularly to improvements in the rear end or holding bag thereof.

A great deal of fishing is done with trawl nets which are made either of manila or cotton twine, these nets being generally of graduated mesh from the wings to the rear or cod end, with very small mesh in the cod end. Under ordinary conditions these nets will catch undesirable small fish, and will pick up all movable objects that come within the sweep of the nets and will retain and hold same, especially if these objects finally reach the body of the trawl.

As a result there is brought to the surface and dumped on board the fishing vessel, many fish and other objects that have no market value, but which must be sorted over and disposed of before marketable fish of suitable size can be identified and prepared for storage. In sorting over the fish, a fork is used and considerable time is occupied during such sorting, with the result that most of the small fish are dead when thrown back into the water or would die because of being pierced by the sorting fork.

Accordingly one object of the present invention is the construction of a trawl which will permit the escape of these small objects and undersized fish, many of which may be of market variety, but too small for sale.

Another object is to minimize the time necessary in sorting over a catch by confining the catch, so far as possible, to marketable fish. Still another object resides in a construction of net in which the mesh is large and practically uniform throughout its entire length thereby reducing resistance to water as the trawl is dragged.

Further objects contemplate a construction, by means of which the net at the cod end is held in an open or distended position, regardless of the size of the mesh, and the provision of means to hold the mesh itself in distended position.

To the attainment of the above and other objects which will appear as the description proceeds, reference may be made to the accompanying drawing, in which Fig. 1 is a top plan view of the trawl in operative position;

Fig. 2 is an enlarged elevation of the cod end of the net; and

Fig. 3 is an enlarged detail of a portion of the cod end.

Referring more specifically to the drawing, in which like reference numerals designate like parts it will be observed from Fig. 1 that the trawl net comprises a body 10 of relatively large size, uniform mesh, having wings 12, head rope 14, ground rope 16, and tow rope 18. The body is reduced at the rear to form a cod end or holding body 20 which is closed at its rear end by means of a puckering string 22. The mesh of the cod end is of uniform size throughout, and is of a size substantially uniform with the mesh of the body, although not necessarily the same size, as distinguished from known types of net in which the mesh is graduated from large size at the forward end, near the head rope, to fine mesh in the cod end. There is a tendency in the use of these nets for the walls of the cod end to come together and the mesh thereof to draw up, and to prevent this, ribs or stringers 24 of rope or suitable material are located along the length of the cod end, these ribs being seized to each mesh as indicated at 26. The ribs 24 may be extended into the body of the net 10 and secured by stranding the ends and hitching them crowfoot fashion, as indicated at 28.

A feature of the present structure resides in the flexible band 30 of fine mesh net between the body of the trawl and the cod end, preferably extending about the mesh of the net, and serving to hold the mouth of the cod end open and to evenly distribute any strains between the cod end and the body. In effect, this band forms a mouth for the cod end. The extreme rear end of the net is finished in loops of relatively heavy material 32 for the reception of the puckering string 22. The ribs 24 may be suitably spliced to form loops 34 for the same purpose.

From the foregoing description the operation of the device will be readily apparent, the net being rigged with tow ropes, head rope, and ground rope for use in a conventional manner. The mesh in the cod end will be held open by means of the ribs or stringers extending from the body through the band of fine mesh to the end of the trawl, which end in actual working is tied up with the puckering string, the flexible band of fine mesh holding the mouth of the cod end open. Due to the fact that the mesh is relatively large throughout, and is held open, the escape of any fish or other objects small enough to go through will be facilitated.

The band of fine mesh may be used for the attachment of any chaffing gear deemed desirable and also furnishes a suitable place to attach the sling when hoisting the catch on board the vessel as to this band of fine mesh netting are attached the ribs which run the full length of the cod end, and carry the weight of the contents of the cod end.

Advantages in this structure reside in the conservation of fish, through escape without injury of small market varieties through the large mesh; in sifting out and eliminating small trash that would otherwise be brought to the surface with marketable fish and in thereby decreasing the time required in sorting market fish from unmarketable matter, as well as reducing the weight of the catch to be handled, with attendant reduction in labor. The use of fine mesh netting extending around the mouth or opening of the cod end, and ribs throughout the length of the cod end serve to hold both the mouth and body of the cod end fully distended, thus assisting entry of the catch thereinto, as well as furnishing means to attach chaffing gear, slings, etc., to the net and also reinforcing this end of the net. This trawl as a whole offers less resistance to towing due to its large mesh which permits unobstructed flow of water through the net, resulting in a corresponding saving in power.

Having thus described my invention, what I claim as new and desire to secure by Letters Patent of the United States, is:—

1. A trawl net comprising a body of mesh, and a cod end of mesh, forming a continuation of said body, the size of the mesh in the cod end being substantially uniform with that in the body.

2. A trawl net comprising a body of mesh and a cod end of mesh, the size of the mesh in the cod end being substantially uniform with that in the body, said cod end having ribs or stringers extending throughout its length and seized to the mesh thereof.

3. A trawl net comprising a body of mesh and a cod end of mesh, forming a continuation of said body, the size of the mesh in the cod end being substantially uniform with that in the body, said net having applied a band of relatively finer mesh located between said body and said cod end.

4. A trawl net comprising a body of mesh and a cod end of mesh, the size of the mesh in the cod end being substantially uniform with that in the body, said cod end having ribs or stringers extending throughout its length and seized to the mesh thereof, said net having a band of relatively finer mesh located between said body and said cod end.

5. A trawl net comprising a body and a cod end formed of mesh, said cod end having ribs or stringers extending throughout its length and seized to the mesh thereof.

6. A trawl net comprising a body and a cod end of mesh, forming a continuation of said body, said net having applied thereto a band of relatively finer mesh located between said body and said cod end.

7. A trawl net having a reduced rear end of relatively coarse uniform mesh, a band of finer mesh extending about the net and spaced from the extreme end of the net and ribs extending from said extreme end lengthwise of the net through said band of finer mesh, and seized thereto.

8. A trawl net comprising a body of mesh and a cod end of mesh, forming a continuation of said body, the size of the meshes in the cod end being uniform throughout, and substantially with that in the body, means to maintain the mouth of said cod end in distended position, and means to close the rear of said cod end.

9. A trawl net comprising a body of mesh and a cod end of mesh, forming a continuation of said body, the size of the meshes in the cod end being uniform throughout, and substantially uniform with that in the body, means to maintain the mesh of said cod end in distended position, and means to close the rear of said cod end.

10. A trawl net comprising a body of mesh and a cod end of mesh, forming a continuation of said body, the size of the mesh in the cod end being uniform throughout, and substantially uniform with that in the body, means to maintain the mouth of said cod end in distended position, and means to maintain the mesh of said cod end in distended position.

11. A trawl net having a body and a cod end, said cod end being constructed to facilitate escape of small objects therefrom and having a reinforcement effective to maintain said end in constantly distended position, said reinforcement being seized to the mesh of the net and unitary with said end.

In testimony whereof I affix my signature.

LLOYD O. RUNKLE.

CERTIFICATE OF CORRECTION.

Patent No. 1,867,281. July 12, 1932.

LLOYD O. RUNKLE.

It is hereby certified that error appears in the printed specification of the above numbered patent requiring correction as follows: Page 2, line 61, after "applied" insert the word thereto, line 78, claim 6, after "thereto" insert a comma, and lines 91 and 92, claim 8, after the word "substantially" insert the word uniform; and that the said Letters Patent should be read with these corrections therein that the same may conform to the record of the case in the Patent Office.

Signed and sealed this 6th day of September, A. D. 1932.

(Seal)

M. J. Moore,
Acting Commissioner of Patents.

DISCLAIMER 1,867,281.—*Lloyd O. Runkle*, Gloucester, Mass. SIFTER TRAWL. Patent dated July 12, 1932. Disclaimer filed May 14, 1935, by the assignee, *The Linen Thread Company*.

Hereby enters this disclaimer of claims numbered 1, 2, 5, 8, 9, 10, and 11, as said claims appear in the original Letters Patent herein above referred to.

[*Official Gazette June 4, 1935.*]